UNITED STATES PATENT OFFICE.

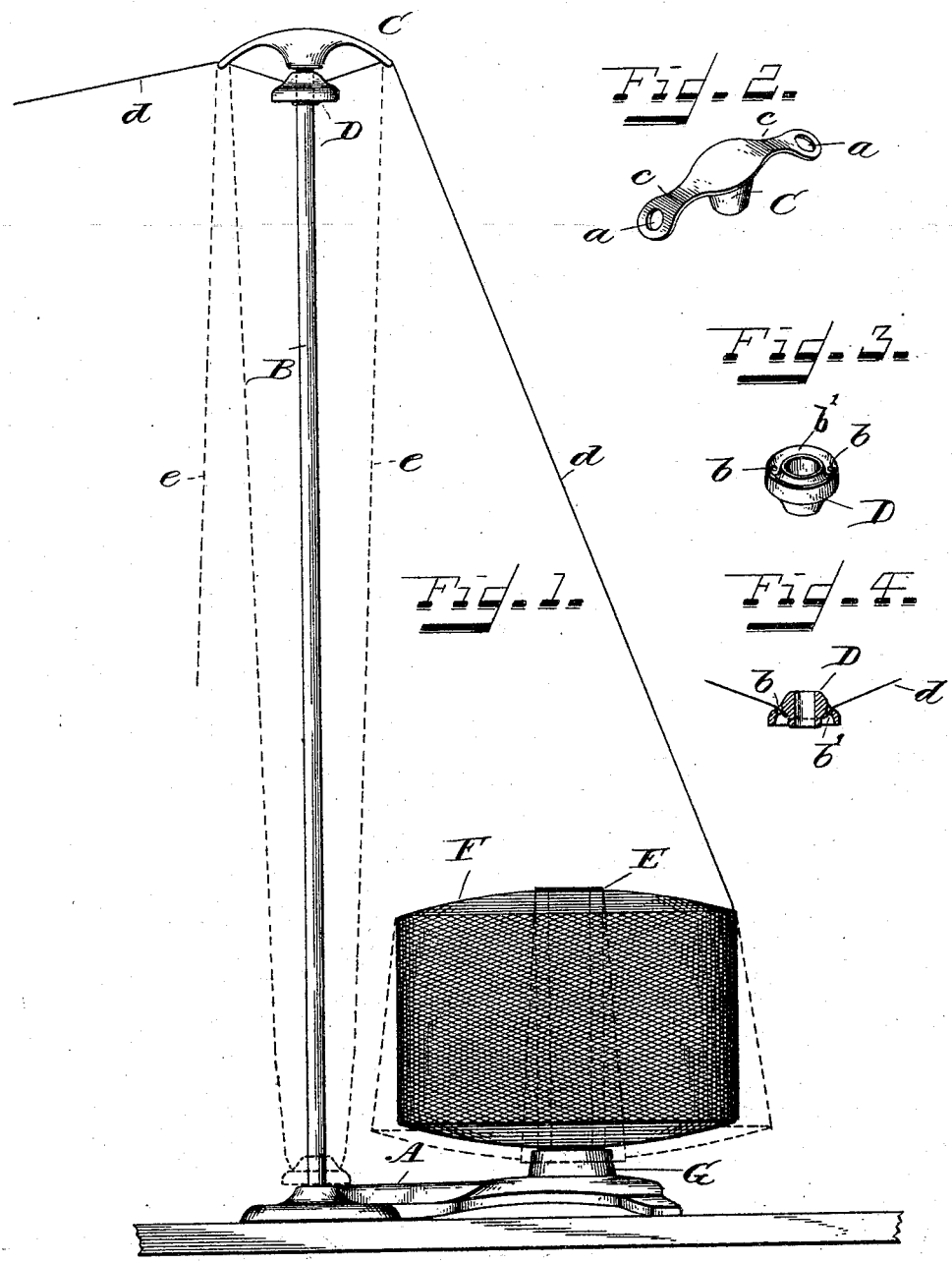

EDWARD B. WESTON, OF DAYTON, OHIO.

TWINE-HOLDER.

SPECIFICATION forming part of Letters Patent No. 604,449, dated May 24, 1898.

Application filed October 24, 1895. Renewed October 18, 1897. Serial No. 655,622. (No model.)

*To all whom it may concern:*

Be it known that I, EDWARD B. WESTON, a citizen of the United States, residing at Dayton, in the county of Montgomery and State of Ohio, have invented certain new and useful Improvements in Twine-Holders, of which the following is a full, clear, and exact description, reference being had to the accompanying drawings, forming part of this specification.

My invention relates to a portable device for holding twine while tying packages, and has for its object to provide a construction of parts for taking up the surplus twine, whereby the twine may be drawn from the holder with the least resistance possible and thereby render the device less liable to be upset in drawing off the twine, and consequently of lighter and cheaper construction.

In the drawings, Figure 1 is a side elevation of my improved holder. Fig. 2 is a perspective view of a guide for the twine. Fig. 3 is a perspective view of the weight. Fig. 4 is a sectional view of same.

My invention is particularly designed for the holding of twine which is wound on a spool or cone.

A is a weighted base-plate, upon one side of which is secured in a vertical position the rod B. On the upper end of this rod is fastened a guide-piece C, consisting of horizontally-extending arms $c\ c$, provided with openings $a\ a$ at each end inclined in pretty nearly vertical planes. Sliding up and down on the rod B is the weight D, the weight being provided with holes $b\ b$ for the twine, lying in inclined positions and connecting with a groove or recess $b'$ on the under side of the weight. On the other side of the weighted base-plate is a pin or stud E, at the bottom of which is a shoulder or cone G, upon which the twine is supported. As the twine is frequently wound in balls, cones, and spools, the stud E, in connection with the shoulder or cone G, provides for the twine wound in any of the different shapes on the same fixture.

The twine $d$ is passed from its spool down through one of the openings $a$ in the guide-piece C, down through one of the openings $b$ and groove $b'$ in the weight D, and up through the other openings in the weight and guide-piece, as shown by the full line $d$ in Figs. 1 and 4.

When the loose end of the twine is pulled forward, the weight D is carried to the top of the rod B. The two holes $b\ b$ and groove $b'$ in the weight D are then on a line with the openings $a\ a$ in the arms $c\ c$ on the guide-piece C, which permits the twine to be readily drawn forth, holding the weight to the top of the rod B. When all of the twine desired is drawn forth, the loose end of the twine being dropped releases the weight D, which drops to the base of the rod B, taking up the surplus twine between the guide-piece C and the base of the rod B, as shown by the dotted lines $e\ e$ in Fig. 1, thus removing the surplus twine from the counter, leaving the loose end dangling separately, where it can be readily grasped when wanted.

It will thus readily be seen that the twine may be drawn from the device with the least resistance possible, that it may be exceedingly light in weight without the liability of being upset while taking off the twine, and that it may be conveniently moved about from place to place.

Having thus described my invention, what I claim, and desire to secure by Letters Patent, is—

In a twine-holder, the combination with a weighted base having a stud or support for the twine and a vertical rod attached thereto, of the opposite horizontally-extending arms at the top of the rod having inclined guide-openings, and a weight sliding on the rod provided with opposite inclined guide-openings and a groove on its under side connecting the openings, substantially as and for the purpose shown and described.

EDWARD B. WESTON.

Witnesses:
J. C. PATTERSON,
MYRTLE B. RANDALL.